United States Patent [19]
Kayatani et al.

[11] Patent Number: 5,692,984
[45] Date of Patent: Dec. 2, 1997

[54] FLEXIBLE DRIVE MEMBER FOR PULLING AND PUSHING AND FLUID-OPERATED MOVING APPARATUS

[75] Inventors: Fuminori Kayatani; Takaaki Nishio, both of Kobe, Japan

[73] Assignee: SR Engineering Company Limited, Kobe, Japan

[21] Appl. No.: 569,966

[22] Filed: Dec. 8, 1995

[30] Foreign Application Priority Data

Dec. 9, 1994 [JP] Japan ............... HEI-6-331940
Sep. 27, 1995 [JP] Japan ............... HEI-7-274767

[51] Int. Cl.$^6$ ........................................ F16G 5/20
[52] U.S. Cl. ........................ 474/205; 72/446; 483/68
[58] Field of Search ............................. 474/101, 110, 474/152, 202, 204, 205, 238, 240, 244–246, 249–251; 72/442, 446, 455, 456; 483/29, 61, 68

[56] References Cited

U.S. PATENT DOCUMENTS

| 107,702 | 9/1870 | Minniss ................. 474/244 X |
| 2,348,522 | 5/1944 | Case ......................... 474/251 |
| 2,831,359 | 4/1958 | Carle ..................... 474/251 X |
| 3,151,491 | 10/1964 | Case ..................... 474/251 X |
| 4,545,779 | 10/1985 | Sakakibara et al. ........... 474/240 |
| 4,813,920 | 3/1989 | Inukai et al. ................ 474/240 |
| 4,826,473 | 5/1989 | Miyawaki ................... 474/240 |
| 4,861,120 | 8/1989 | Edwards et al. .......... 474/240 X |
| 4,894,048 | 1/1990 | Inukai et al. ................ 474/240 |

FOREIGN PATENT DOCUMENTS

| 60-172429 | 9/1985 | Japan . |
| 61-143719 | 9/1986 | Japan . |
| 1-28901 | 9/1989 | Japan . |
| 3-18924 | 2/1991 | Japan . |
| 4-21613 | 5/1992 | Japan . |

Primary Examiner—Roger J. Schoeppel
Attorney, Agent, or Firm—Robert E. Rosenthal; William H. Murray

[57] ABSTRACT

A flexible drive member for pushing and pulling an article includes a toothed belt section and ridge members which are arranged on the opposite surface of the toothed belt section along the length direction of the toothed belt section. The ridge members abut adjacent ones when the toothed belt section extends straight. The ridge members include respective hold portions which hold an elongated member, such as a hose and a wire. The abutment of adjacent ridge members enables transmission of pushing force. A fluid-operated device moving apparatus utilizes the flexible drive member which is arranged to have a T-shaped transverse cross-section corresponding to a T-shaped groove in which the flexible drive member can be guided. A fluid-operated device, such as a hydraulically operated clamping device, is coupled to one end of the flexible drive member. A drive unit including a toothed pulley in mesh with the teeth of the flexible drive member drives the flexible drive member and, hence, the clamping device along the T-shaped groove.

18 Claims, 10 Drawing Sheets

FLEXIBLE DRIVE MEMBER FOR PULLING AND PUSHING AND FLUID-OPERATED MOVING APPARATUS

This invention relates to a flexible drive member for use in pulling and pushing an article, for example, a fluid-operated device, such as die clamping device of a press which is moved along a T-shaped groove, and also to an apparatus utilizing such flexible drive member for moving a fluid-operated device, i.e. hydraulic or pneumatic device.

BACKGROUND OF THE INVENTION

Japanese Examined Utility Model (UM) Publication (KOKOKU) No. HEI 4-21613 discloses an example of flexible drive member for pulling and pushing a clamping device for clamping dies to a bolster and a slide of a press, to thereby move the clamping device along a T-shaped groove formed in the top surface of the bolster or in the bottom surface of the slide. The flexible drive member disclosed in this Japanese Examined UM Publication No. HEI 4-21613 includes a chain with side rollers secured to it, and supports extending from links of the chain for supporting a hose or a cable for a fluid or a signal for driving the clamping device. The side rollers are inserted into the wider portion of the T-shaped groove from one end thereof so that the rollers and, hence, the flexible drive member are guided along the groove. A clamping device is coupled to the inserted end of the chain, and the other end of the chain outside the groove is driven through a sprocket engaging with the side rollers so that the clamping device is pushed and pulled.

Another types of apparatus for pushing and pulling a hydraulic clamping device are shown in, for example, Japanese Unexamined UM Publication (KOKAI) No. HEI 3-18924 and Japanese Unexamined Patent Publication (KOKAI) No. SHO 60-172429. All of such apparatuses, however, use a chain with side rollers. Another type of pushing and pulling flexible drive member which does not use a chain with side rollers is shown in Japanese Unexamined UM Publication (KOKAI) No. SHO 61-143719. This flexible drive member uses a belt which is clamped between a pair of rollers for driving the belt forward and backward. The belt is desirable, since it is less bulky than a chain with side rollers.

Japanese UM Publication No. HEI 1-28901 shows a hydraulic clamping device which is driven by a chain with side rollers. When a clamping device is not used, it is moved to a standby position and is held there in such a manner as to not move or rattle. For that purpose, a block of metal or suitable material is secured at the standby position, and the clamping device is operated to clamp the block so that the clamping device does not rattle.

Conventional chains with side rollers are special chains having rollers attached on both sides of the chain, and, therefore, are not commercially available. Furthermore, a number of steps are required to produce a chain with side rollers, and, a still larger number of steps are required for securing the supports for the fluid hose to the chain. Therefore, the cost of such flexible drive member is high. In addition, since the chain with side rollers is driven by means of a sprocket wheel, it generates noise and, therefore, cannot be used in an environment in which noise cannot be tolerated. Furthermore, since it requires oiling, it cannot be used in an environment where pollution with oil is undesired.

The aforementioned belt-type flexible drive member is desirable because of its smaller dimensions. However, since the belt is clamped between rollers for driving, it is difficult to secure supports to the belt for supporting a fluid hose or a signal cable.

Conventional clamping devices such as the above-described one shown in Japanese Examined UM Publication No. HEI 1-28901 have disadvantages that a strong block which can withstand the clamping by the device must be installed, and, that the block may interfere with other working.

An object of the present invention is to provide a flexible drive member and a fluid-operated device moving apparatus using a flexible drive member, with the above-described disadvantages of prior arts eliminated.

SUMMARY OF THE INVENTION

According to the present invention, a flexible drive member for use in pushing and pulling an article is provided. The flexible drive member includes a toothed belt section which has teeth on its one surface, and a number of ridge members arranged along the length of the toothed belt on the opposite, rear surface of the belt. The ridge members are arranged such that they abut against adjacent ridge members when the toothed belt extends straight to thereby prevent the belt from bending with the teeth facing outward. The ridge members are provided with holding sections for holding a flexible, elongated members on the rear surface of the toothed belt along the length direction of the belt section.

A conventional toothed belt is flexible and, therefore, although it can transmit pulling force to an article, it cannot push the article. The use of ridge members enables such pushing force transmission. Thus, advantages inherent to a toothed belt can be utilized. Specifically, it is light-weighted relative to a chain, can be driven by a toothed pulley or gear, needs no oiling, generates little noise, and is thin.

The ridge members may be provided with portions to be guided for moving the flexible drive member along its length direction. The flexible drive member with the ridge members may be shaped to have a generally T-shaped transverse cross-section, whereby the flexible drive member can be pushed and pulled along a T-shaped groove with the upper, lower and side surfaces of the T-shaped groove serving as guide surfaces.

The toothed belt section of the flexible drive member may be a toothed belt, while the ridge members may be separate members from the toothed belt and attached to the toothed belt. Then, a commercially available toothed belt may be used for the toothed belt section. The ridge members may preferably be formed of synthetic resin, such as an acetal resin and nylon. Alternatively, the ridge members may be formed of metal which may be die-cast, cast by lost-wax process, or pressed.

Alternatively, the toothed belt section and the ridge members may be integral with each other.

According to the present invention, an apparatus for moving a fluid-operated device using the above-described flexible drive member is provided. The ridge members are provided with a holding section which holds at least a fluid-operated hose to extend on the rear surface of the toothed belt section along the length direction of the belt section. The flexible drive member is constructed to have a cross-sectional shape corresponding to a given T-shaped groove so that it can be guided by the inner surfaces of the T-shaped groove to move along the T-shaped groove. The fluid-operated device includes a portion which engages with the T-shaped groove and which is coupled to one end of the flexible drive member, so that it can move along the T-shaped groove. The moving apparatus further includes a drive unit which includes a toothed pulley. The toothed pulley engages with the teeth of the flexible drive member to selectively push and pull the flexible drive member along the length direction, which results in movement of the fluid-operated device back and forth along the T-shaped groove.

The drive unit may be a rotary drive source, such as a motor, or linear drive means, such as a fluid-operated cylinder.

The fluid-operated device may be a die clamping device which is movable between a die clamping position and a standby position, and the drive unit moves the die clamping device between the two positions. The die clamping device may be provided with fixing means for releasably fixing the die clamping device at the standby position.

DETAILED DESCRIPTION OF THE INVENTION

Now, a flexible drive member according to a first embodiment of the present invention and a fluid-operated device moving apparatus using the flexible drive member are described with reference to FIGS. 1 through 7. The fluid-operated device to be described is a hydraulic clamping device which clamps dies of a press. The flexible drive member may be used with another fluid-operated device.

Figure 3:
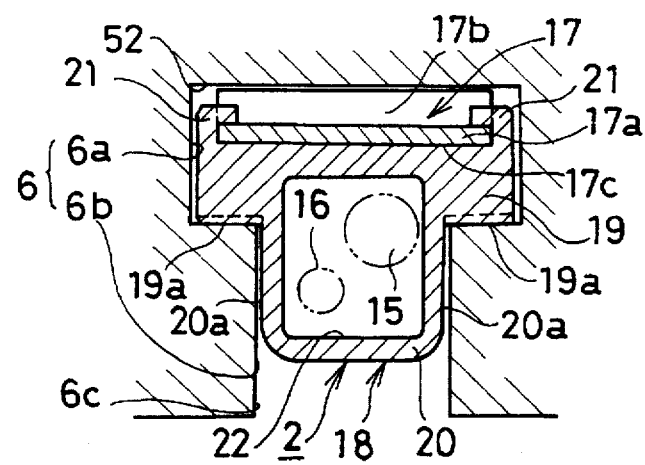
FIG. 3 is a cross-sectional view along a line III—III in FIG. 1.

The flexible drive member is used in an apparatus for pushing and pulling the hydraulic clamping device. A drive unit 3 is used to move the hydraulic clamping device 1, which clamps an upper die of a press to a slide, between its clamping position and standby position by means of the flexible drive member 2. The apparatus is mounted on the slide 4. A T-shaped groove 6 is formed in the bottom surface of the slide 4. The T-shaped groove 6 has a groove bottom 52, and includes a wider portion 6a, a narrower portion 6b and an opening 6c (FIG. 3).

Figure 4:
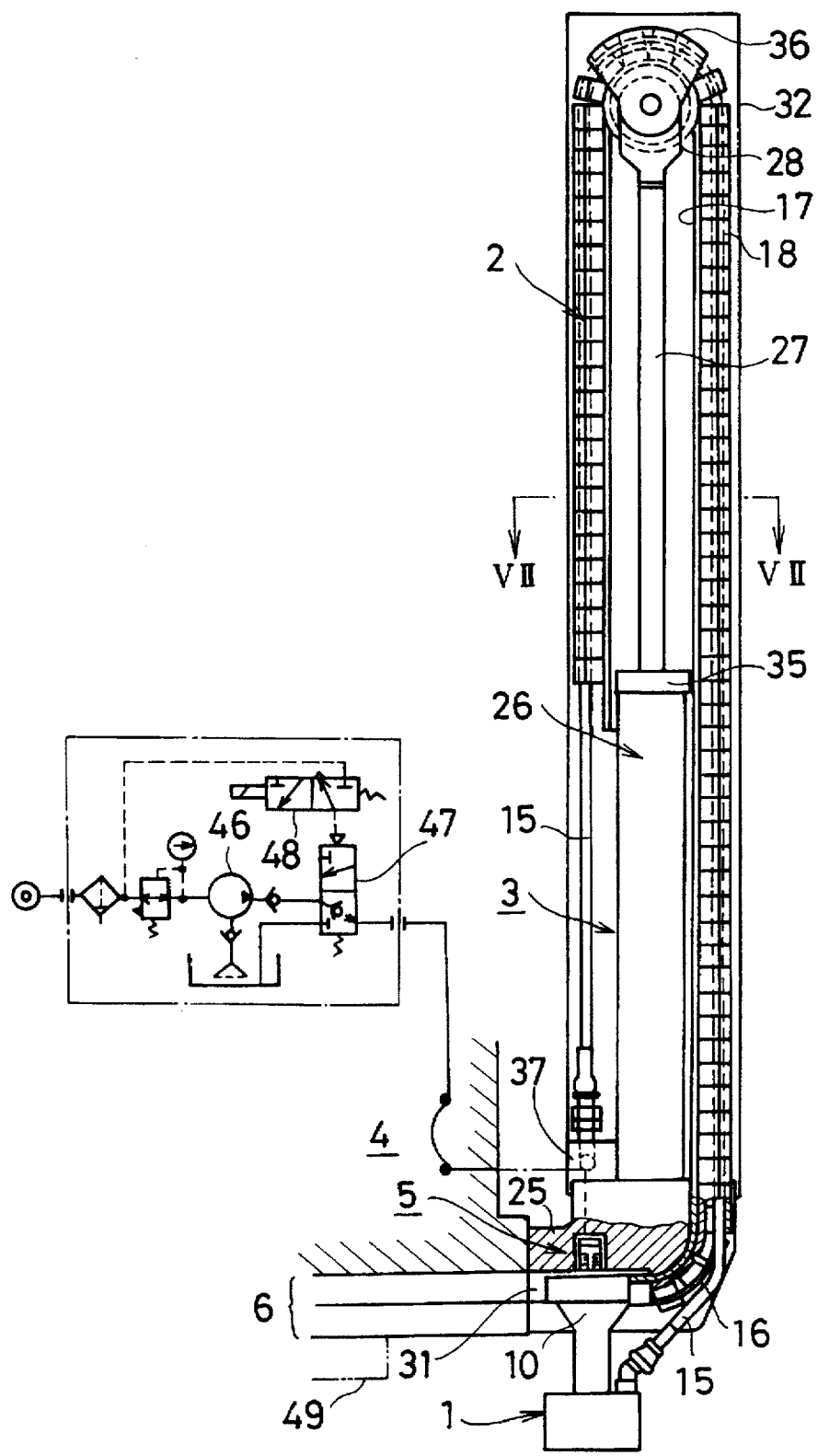
FIG. 4 is a front elevational, partly cross-sectional view of a die clamping device moving apparatus using the flexible drive member according to the first embodiment.
Figure 5:
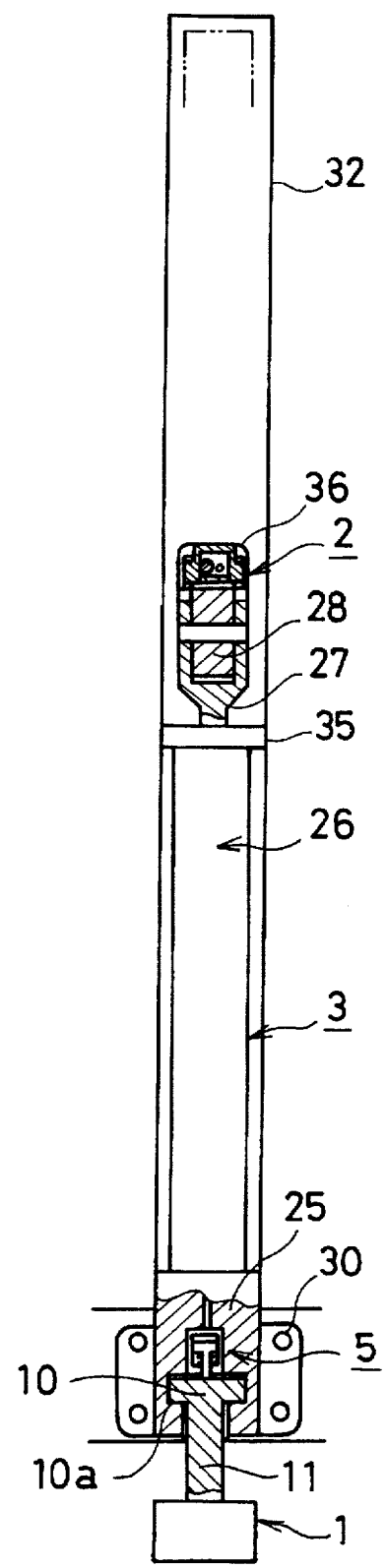
FIG. 5 is a side elevational, partly cross-sectional view of the moving apparatus shown in FIG. 4, but in a different state.
Figure 6:
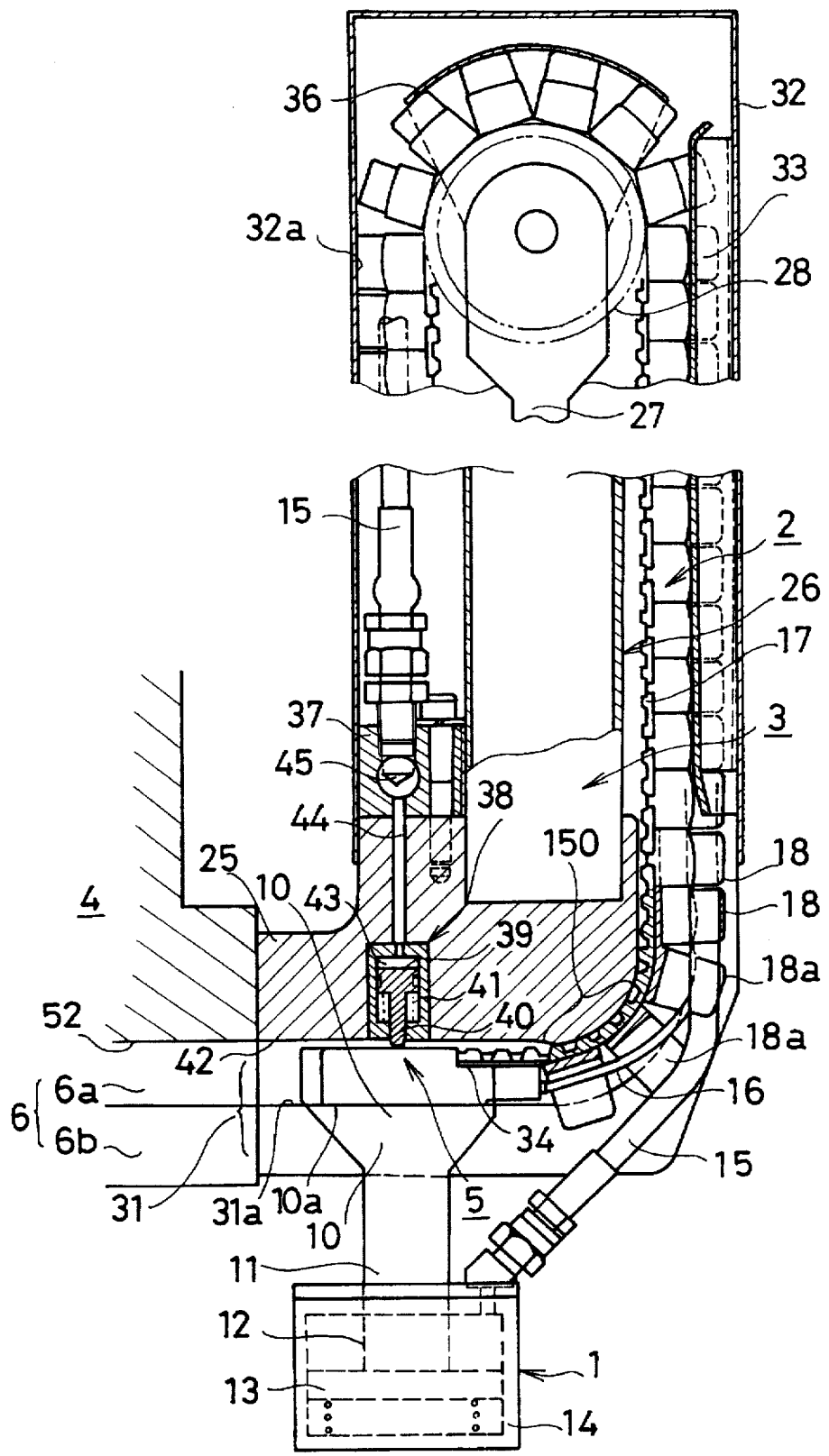
FIG. 6 is an enlarged view of a part of the apparatus shown in FIG. 4.

The clamping device 1 is shown in the lower portion of FIGS. 4, 5 and 6, and includes an engagement section 10 which engages with the T-shaped groove 6 of the slide 4. The clamping device 1 is a conventional one. The lower portion of a shaft 11 extending downward from the engagement section 10 is used as a piston rod 12. A piston 13 (shown in FIG. 6 by a broken line) is connected to the lower end of the piston rod 12. The piston 13 is fitted into a cylinder 14 which is supplied with compressed oil through a hose 15.

When the clamping device 1 is moved to the clamping position and compressed oil is supplied into the cylinder 14, the cylinder 14 is moved toward the engagement section 10 to clamp a die between its upper surface and the bottom surface of the slide 4.

The clamping device 1 includes a sensor switch which can senses a portion of a die to thereby notify the arrival of the clamping device 1 at a predetermined position. The sensor switch generates a signal indicating the arrival of the clamping device 1, which signal is fed through a signal cable 16. The signal cable 16 extends substantially along the hydraulic hose 15 as will be described later.

Figure 1:
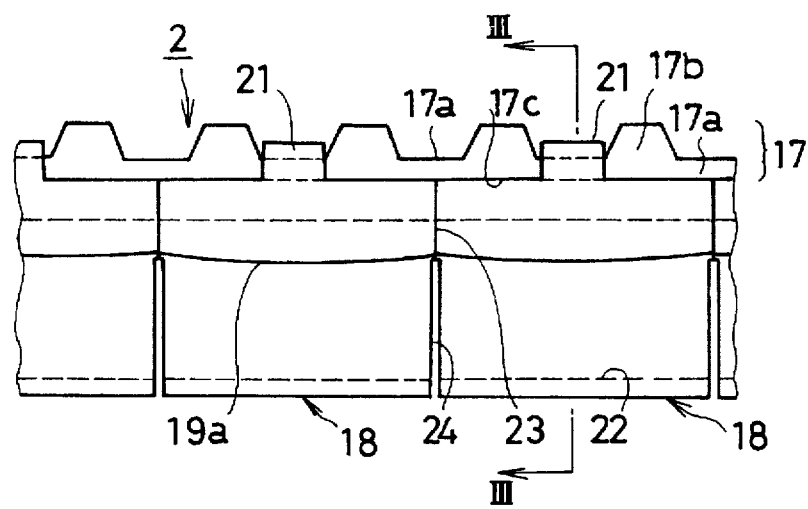
FIG. 1 is a front elevational view of a part of a flexible drive member according to a first embodiment of the present invention.
Figure 2:
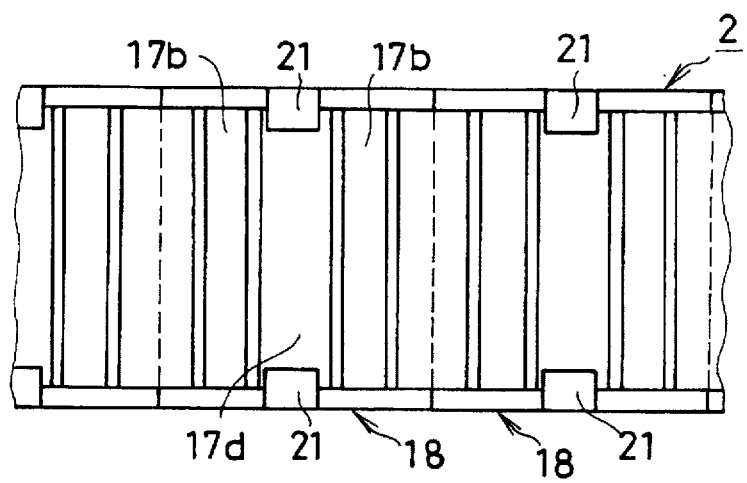
FIG. 2 is a plan view of the flexible drive member of FIG. 1.

The flexible drive member 2 includes a toothed belt 17 and ridge members 18 as shown in FIGS. 1, 2 and 3. The flexible drive member 2 is arranged or shaped to loose fit in the T-shaped groove 6, and has a transverse cross-section in a plane perpendicular to the length direction of the belt 17, which is generally conformal to the cross-section of the T-shaped groove 6 as shown in FIG. 3. The toothed belt 17 may be a commercially available one which includes a belt body 17a having a width slightly smaller than the width of the wider portion 6a of the T-shaped groove 6, and successive teeth 17b extending across the width of the belt body 17a. The material of the belt may be urethane, and an elongation preventing members, such as metallic wires and synthetic fibers, are embedded in the belt. An example of such commercially available toothed belts is "FREE SPAN TIMING BELT", Chemistar®-U, Type 040-T10, available from MITSUBOSHI BELTING LTD., Kobe, Japan.

The ridge members 18 are mounted on the rear surface 17c of the toothed belt 17 and are formed by molding synthetic resin, such as acetal resin or nylon. One ridge member 18 is mounted for two pitches of the teeth 17b. As shown in FIG. 3, the ridge member 18 includes a larger width portion 19 contacting the rear surface 17c of the toothed belt 17, a smaller width portion 20 which extends downward from the portion 19, engaging portions 21 on opposite sides of the portion 19, and a hole 22 extending through the ridge member 18 in the direction along the length of the belt 17.

The larger width portion 19 has a width slightly larger than the width of the toothed belt 17, and the smaller width portion 20 extends from a center portion of the lower portion of the portion 19. The two edge portions of the bottom surface of the larger width portion 19 are formed to have an arcuate surface 19a convex downward, as is seen in the front view shown in FIG. 1.

The smaller width portion 20 has such a width as to pass through the narrower portion 6b of the T-shaped groove 6, and extends in the narrower portion 6b to a point more or less spaced from the opening 6c of the T-shaped groove 6.

The engaging portions 21 are hook-like members formed to extend from the opposite sides of the larger width portion 19 and fitted to clip the respective sides of the belt body 17a in the bottom of the tooth space 17d between two adjacent teeth 17b, as shown in FIGS. 1, 2 and 3. Thus, the ridge member 18 is secured to the toothed belt 17.

The longitudinally extending hole 22 has any shape, but it must have a size which permits the hydraulic hose 15 and the signal cable 16 to extend through it with such a margin as to permit their relative movements therein.

With the ridge members 18 secured to the toothed belt 17, the end surfaces 23 of the larger width portions 19 of adjacent ridge members 18 contact each other when the flexible drive member 2 is extending straight. In the illustrated embodiment, the end surfaces 24 of the smaller width portions 20 are slightly spaced from adjacent end surfaces 24, but they may be arranged to contact each other, too.

As shown in FIGS. 4, 5, 6 and 7, the drive unit 3 includes an air cylinder 26 secured to a base 25, a toothed pulley 28 mounted on a piston rod 27 of the air cylinder 26, and a guide 33.

The base 25 is secured to the side of the slide 4 by means of bolts 30, and includes a T-shaped groove 31 which continues the T-shaped groove 6 in the bottom surface of the slide 4. The T-shaped groove 31 extends away the slide 4 horizontally, then curves upward along an arc, and opens at the upper surface of the base 25.

The air cylinder 26 extends vertically with its head cover end secured to the upper surface of the base 25. The toothed pulley 28 is rotatably mounted at the end of the upward projecting piston rod 27.

A cover 32 covers the moving apparatus with a room left for permitting the piton rod 27 to fully extend in it. On the inner surface of the cover 32, at a location along the extension of the upward extending T-shaped groove 31, a guide 33 is disposed to extend upward. The details of the guide 33 will be described later.

The flexible drive member 2 is assembled with the drive unit 3, and the clamping device 1 is coupled to the end of the flexible drive member 2.

The clamping device 1 is coupled to the flexible drive member 2 in such as manner as shown in FIG. 6. An appropriate portion of the engagement section 10 of the clamping device 1 which are in the wider portion of the T-shaped groove 6 or 31 is removed to form a recess 34. The end of the toothed belt 17 rests on the recess 34 and is secured to it by suitable means. The end portion of the toothed belt is provided with no ridge members 18, but a plurality, three, for example, of ridge members 18a are secured to the toothed belt 17 in the portion adjacent to the end secured to the clamping device 1. The ridge members 18a have part of the wall defining the hole 22 of the ridge members 18 removed. The reason why part of the wall of the hole 22 is removed is that since the end of the hydraulic hose 15 is coupled to the rod cover of the cylinder 14 of the clamping device 1, the hydraulic hose 15 cannot extend along the toothed belt 17 in the area where the flexible drive member 2 is coupled to the clamping device 1. The ridge members 18a are used to secure the transmission of pulling force to the point where the flexible drive member 2 is coupled to the clamping device 1.

The flexible drive member 2 extends upward beyond the upper end of the T-shaped groove 31, bends with the teeth 17b facing inward to extend over the toothed pulley 28, and then extends downward. The end of the flexible drive member 2 then is secured to a rod cover 35 of the air cylinder 26, as shown in FIGS. 4 and 6.

Figure 7:
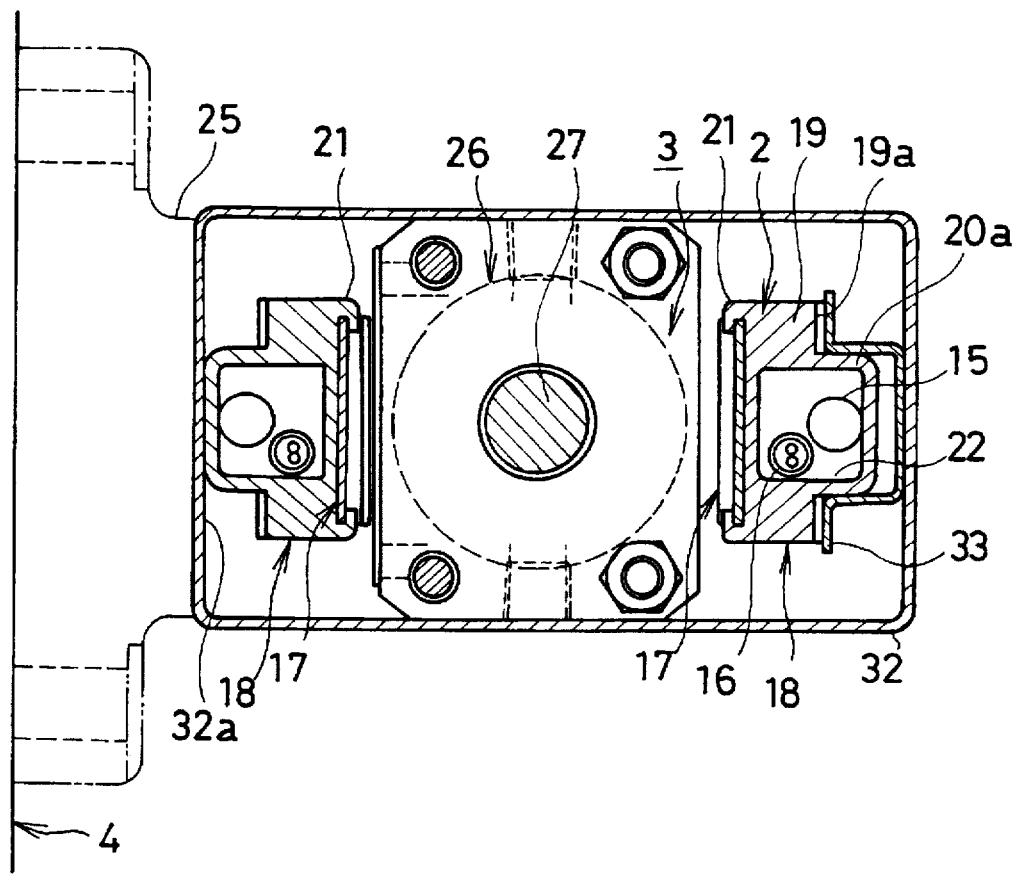
FIG. 7 is an enlarged, cross-sectional view along a line IV—IV in FIG. 4.

Referring to FIGS. 6 and 7, the guide 33 is secured to the cover 32 and guides, along a straight line, the flexible drive member 2 extending upward from the T-shaped groove 31, contacting for guiding the arcuate curving surfaces 19a of the larger width portions 19 and the side surfaces 20a of the smaller width portions 20 of the respective ridge members 18. The portion of the flexible drive member 2 on the opposite side of the air cylinder 26 is guided along a straight line by the inner surface 32a of the cover 32 which directly contacts the end surfaces of smaller width portions of the respective ridge members 18. The cover 32 is secured to the base 25.

An auxiliary cover 36 is mounted to cover the flexible drive member 2 bending over the toothed pulley 28 to secure the engagement of the teeth of the toothed pulley 28 with the teeth 17b of the toothed belt 17. The auxiliary cover 36 is secured to the piston rod 27.

The proximal ends of the hydraulic hose 15 and signal cable 16 held by the flexible drive member 2 are coupled to a piping block 37 and a terminal box (not shown) disposed near the block 37, respectively.

Fixing means 5 is used to fix and hold the clamping device 1 when it is in the standby position where the engagement section 10 of the clamping device 1 is within the T-shaped groove 31 in the base 25. As shown in FIGS. 4, 5 and 6, the fixing arrangement 5 includes a hydraulic cylinder 38 which is substantially smaller than the hydraulic cylinder 14 of the clamping device 1, which includes a piston 39, a piston rod 40, and a return spring 41. The fixing arrangement 5 is embedded in the bottom 42 of the T-shaped groove 31 in the base of the drive unit 3, at a location corresponding to the center of the upper surface of the engagement section 10 of the clamping device 1 in its standby position. With the clamping device 1 in the standby position, the piston rod 40 extends beyond the bottom 42 of the T-shaped groove 31 into the groove 31 to press down the upper surface of engagement section 10 to fix it. A hydraulic circuit 44 is coupled to a hydraulic chamber 43 to cause the piston rod 40 protrude. The hydraulic circuit 44 branches from a path 45 in the piping block 37 which is communicating with the hydraulic hose 15. Accordingly, when compressed oil is supplied to the hydraulic cylinder 14 of the clamping device 1, compressed oil is also supplied to the hydraulic cylinder 38 of the fixing arrangement 5, and when compressed oil is removed from the hydraulic cylinder 14, it is also removed from the hydraulic cylinder 38.

A hydraulic pressure source for the clamping device 1 may be advantageously formed by an pneumatic-to-hydraulic converter 46 which converts pneumatic pressure provided by compressed air widely used in a plant into hydraulic pressure, an air-pilot type switch valve 47 coupled to the output of the pneumatic-to-hydraulic converter 46, and a pilot electro-magnetic valve 48 for the switch valve 47.

In operation of the movable clamping device with the above-described arrangement, by stretching and contracting the air cylinder 26 of the drive unit 3 in the unclamping state of the device 1 in which compressed oil is removed from the device 1, the clamping device 1 coupled to the distal end of the flexible drive member 2 moves back and force along the T-shaped grooves 31 and 6 shown in FIGS. 4 and 6. In the state shown in FIGS. 4 and 6, the air cylinder 26 is stretched, in which the toothed pulley 28 goes upward so that the bent portion of the flexible drive member 2 is shifted upward. The straight portions of the member 2 are restricted by the guide 33 and the inner surface 32a of the cover 32 so that they do not swell outward. The distal and of the flexible drive member 2 is pulled into the base 25 so that the clamping device 1 itself is pulled into the groove 31 in the base 25 to assume the standby position. In the state shown in FIGS. 4 and 6, compressed oil is supplied to the hydraulic cylinders 14 and 38. In this state, the clamping device 1 is in the clamping state in its standby position, and the piston rod 40 of the hydraulic cylinder 38 of the fixing device 5 extends into the T-shaped groove 31 to press dow the engagement section 10 of the clamping device 1 to fix it in the standby position. In this fixing state, the lower surface 10a of the engagement section 10 is pressed against the engaging surface 31a of the T-shaped groove 31 by the force exerted by the hydraulic cylinder 38, and, therefore, even if the slide 4 moves up and down, the clamping device 1 does not move or rattle.

The fixing device 5 is useful, because usually a plurality of such clamping devices 1 are associated with a slide 4 to clamp a plurality of dies, and the press may be operated only with some of clamping devices 1 and with the remaining unused clamping devices 1 placed in the standby position, the unused clamping devices 1 can be fixed in the standby position by the fixing device 5.

When the air cylinder 26 is contracted to the state as shown in FIG. 5, with compressed oil removed from the hydraulic cylinder 14 of the clamping device 1 and from the fixing device 5, the toothed pulley 28 is lowered. Since the outward movement of the flexible drive member 2 in engagement with the toothed pulley 28 is restricted by the inner surface 32a of the cover 32 and the guide 33, the toothed pulley 28 is not disengaged from the toothed belt 17 when the pulley 28 is lowered, but the pulley 28 rotates in the clockwise direction in FIG. 4 to compress the flexible drive member 2 toward the clamping device 1. This compression force is transmitted through mutually abutting ridge members 18 to the clamping device 1 so that the clamping device 1 is pushed by the distal end of the flexible drive member 2. Thus the clamping device 1 is moved in the T-shaped groove 31 into the T-shaped groove 6.

As shown in FIG. 3, the flexible drive member 2 is supported in the T-shaped groove 6, with the convex lower surface 19a of the ridge member 18 supported on a shoulder formed between a wider groove portion 6a and a narrower groove portion 6b, and with the side surfaces 20a of the smaller width portion 20 of the ridge member 18 guided by the narrower groove portion 6b.

When the clamping device 1 advances into the T-shaped groove 6 to sense the upper die of the press by means of a contact switch or the like (not shown) on the clamping device 1, a signal indicating that the the upper die is transmitted to a control unit (not shown) via the signal cable 16, and the control unit commands the supply of compressed air to the air cylinder 26 to be stopped so that the flexible drive member 2 stops moving. After that, compressed oil is supplied to the clamping device through the hydraulic hose 15 so that the clamping device 1 operates to push a clamp portion 49 (FIG. 4) of the upper die of the press against the bottom surface of the slide 4 to thereby clamp the upper die. At the same time, the hydraulic cylinder 38 is also operated and the piston rod 40 is pushed out to the full extent. In this state, the toothed belt 17 is beneath the fixing device 1, but the extent to which the piston rod 40 protrudes is such as to not damage the toothed belt 17.

After a given processing is finished, the upper die is unclamped by removing compressed oil from the hydraulic cylinder 14, and the air cylinder 26 is stretched to raise the toothed pulley 28. The counterclockwise rotation of the pulley 28 causes the flexible drive member 2 to be retracted to the standby position in the base 25. The retracting movement of the clamping device 1 is stopped by deenergizing the air cylinder 26 upon detection of the arrival of the clamping device 1 at the standby position. Alternatively, it may be arranged that when the air cylinder 26 is fully extended, the clamping device 1 comes to the standby position.

When the flexible drive member 2 is pulled, a tensile force is exerted to it, and the tensile force is transmitted by the toothed belt 17. Since the tooth tips of those teeth 17b of the toothed belt 17 which are in the area where the belt 17 bends upward contact with the inner arcuate surface portions 150 (FIG. 6) of the T-shaped groove 81 of the base 25 of the drive unit 3, the coefficient of friction of the contacting surface of the T-shaped groove 81 should preferably be small. For that purpose, the surface of the area 150 may be coated with a fluorine plastic having a small coefficient of friction, or a block of fluorine plastic may be embedded in the area 150.

A second example of fluid-operated device moving apparatus according to the present invention in which the flexible drive member 2 of the first embodiment is used is described with reference to FIG. 8. The same reference numerals as used in FIGS. 1 through 7 denote the same or similar members, and no further description about them is given.

The second fluid-operated device moving apparatus differs from the afore-described apparatus in that the drive unit 3a comprises an electric motor 151 and a toothed wheel 152, and that a path for supplying compressed oil to the clamping device 1 and the hydraulic cylinder 38a of the fixing device 5 are disposed in the T-groove engagement section 10. The piston rod of the hydraulic cylinder 38a push against the bottom of the T-shaped groove.

The drive unit 3a has a base 25a, which includes the T-shaped groove 31 continuing to the T-shaped groove 6 in the slide 4 as in the first example of the moving apparatus. The bottom of the T-shaped groove 31 in the base 25a in the upper region of the curving area 150 and in the portion above it is removed to form a cavity having an opening 153 toward the groove 31. The toothed wheel 152 is rotatably supported by a horizontal shaft 154 by the base 25a in the cavity in such a manner that a portion of the periphery of the toothed wheel 152 protrudes into the T-shaped groove 31. The teeth of the toothed wheel 152 are in engagement with the teeth 17b of the toothed belt 17 of the flexible drive member 2 which runs vertical. One end of the shaft 154 is provided with a bevel gear which engages with a bevel gear attached to the end of an output shaft of a motor 151 which is a vertical shaft geared motor rotatable in both forward and reverse directions.

The cover 32 is substantially the same as the cover 32 of the first example, but it is not provided with no guide 33. The flexible drive member 2 has its portion closer to the proximal end is restricted in movement by the inner surface portions 32a and 32b of the cover 32 so that the upper bending portion of the flexible drive member 2 can move upward and downward as the flexible drive member 2 is driven to move up and down by the toothed wheel 152 which is rotated by the motor 151.

Alternatively, the motor 151 may be replaced by a hydraulic motor or air motor as long as it can rotate in either direction.

The hydraulic cylinder 38a of the fixing device 5 is disposed in a recess formed in the T-shape engagement section 10 of the clamping device 1. The distal end of the hydraulic hose 15 is coupled to the engagement section 10 of the clamping device 1 within the T-shaped groove 31, and the compressed oil feeding path 155 is formed to extend through the engagement section 10, the shaft 11, and the piston rod 12. The path 155 connects the hydraulic hose 15 with a pressure chamber 156 of the clamping device 1. A branch 157 connects the path 155 to a pressure chamber 43 of the hydraulic cylinder 38a of the fixing device 5. When compressed oil is supplied to the clamping device 1, the cylinder 14 moves toward the engagement section 10 against the action of a spring 158 to clamp an article.

In operation, when the motor 151 of the drive unit 3a rotates, with the clamping device in the unclamping state where compressed oil is removed from the clamping device 1, the clamping device 1 coupled to the distal end of the flexible drive member 2 moves in the T-shaped groove 6 or 31 forward or backward depending on the direction of rotation of the motor. FIG. 8 shows the operating state in which a substantial portion of the flexible drive member 2 is retraced into the cover 32 with the bending portion of the member 2 being almost in its uppermost position, so that the clamping device 1 is in its standby position where the fixing device 5 locks the clamping device 1 secure.

Figure 8:
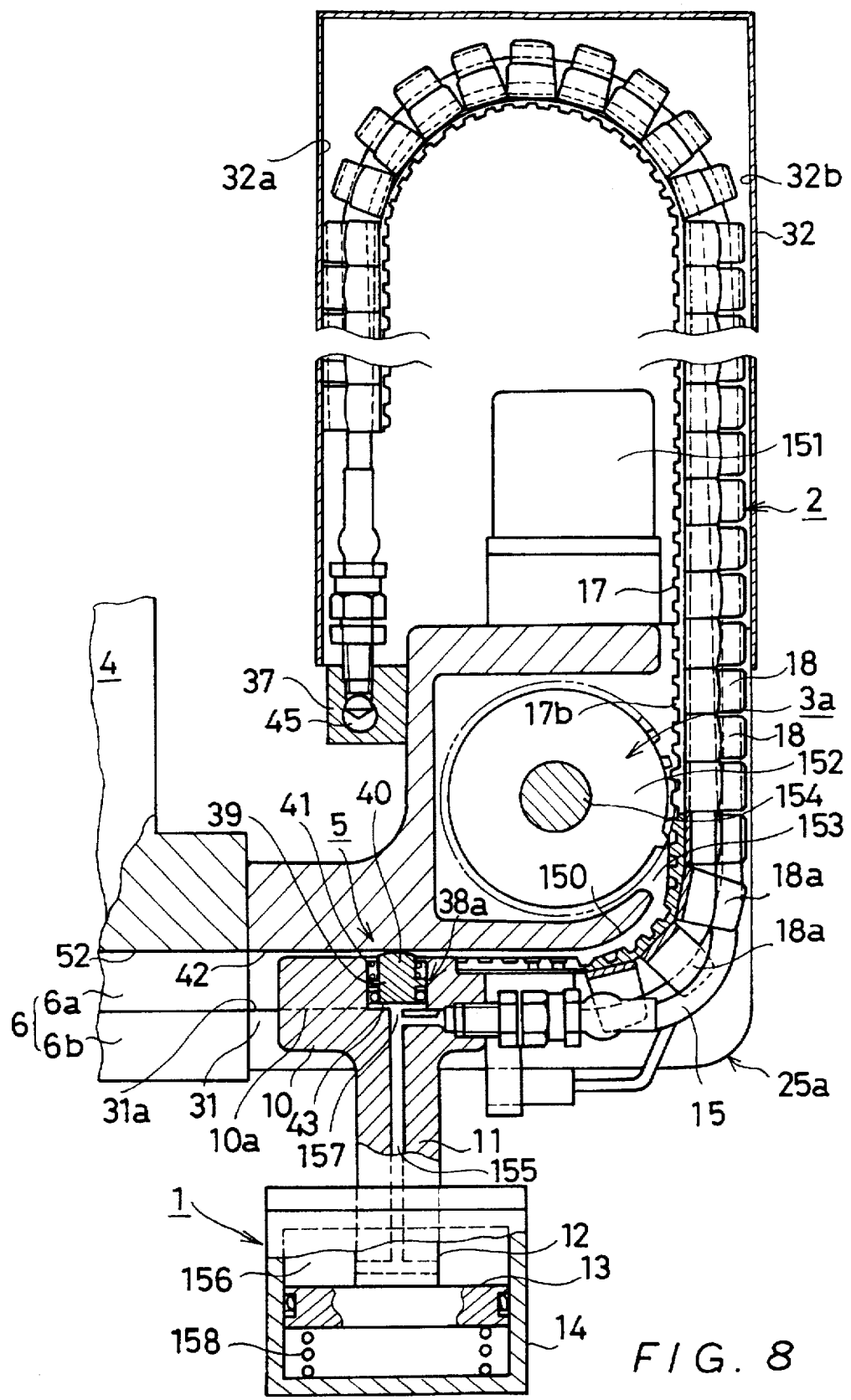
FIG. 8 is a front elevational, partly cross-sectional view of a die clamping device moving apparatus according to another embodiment of the invention, using the flexible drive member shown in FIG. 1.

When compressed oil is removed from the clamping device 1 in the state shown in FIG. 8, the engagement section 1 is released from the locked state by the fixing device 5. Then, the motor 151 is energized to rotate in a predetermined direction, which causes the flexible drive member 2 in mesh with the toothed wheel 152 to be driven forward so that the clamping device 1 advances to the clamping position. When the clamping device 1 arrives at the clamp portion (see FIG. 4) of the upper die (not shown), the flexible drive member 2 is stopped. Then compressed oil is fed to the clamping device 1 so as to clamp the upper die. When clamping device 1 is energized to clamp the upper die, the fixing device 5 is also operated so that the piston rod 40 protrudes upward, but it does not interferes with the operation. With the upper die clamped the press is operated.

For replacing dies, compressed oil is exhausted so that the clamping device is placed in the unclamping state and, at the same time, compressed oil in the fixing device 5 is also removed so that the piston rod 40 is retracted. Then, the clamping device 1 is retracted to the standby position within the T-shaped groove 31 by rotating the motor 151 in the opposite direction, which causes the flexible drive member 2 to be retracted. The dies can be replaced with the clamping device 1 held in the standby position.

When compressed oil is supplied to the clamping device 1 in the standby position, it acts as if it clamps an upper die, and, at the same time, the piston rod 40 of the fixing device 5 protrudes upward to push against the groove bottom 42 so that the engagement section 10 is pushed downward. This results in that the surface 10a of the section 10 is pressed against the engaging surface 31a of the T-shaped groove 31 so that the clamping device 1 is secured in the standby position as shown in FIG. 8. Therefore, even if the slide 4 moves up and down, the clamping device 1 does not moves to rattle.

Both examples of the clamping device moving apparatus described above clamp an upper die to a slide of a press. Needless to say, the apparatus can be applied to a clamping device which clamps a lower die to a bolster of a press machine.

Furthermore, the fixing device 5 of the second example can be used in the first example, too.

Figure 9:
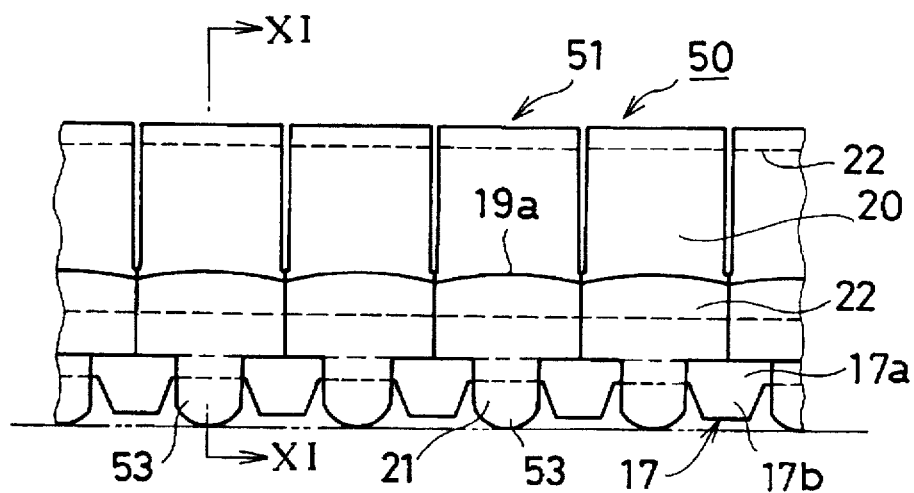
FIG. 9 is a front elevational view of a part of a flexible drive member according to a second embodiment of the present invention.
Figure 10:
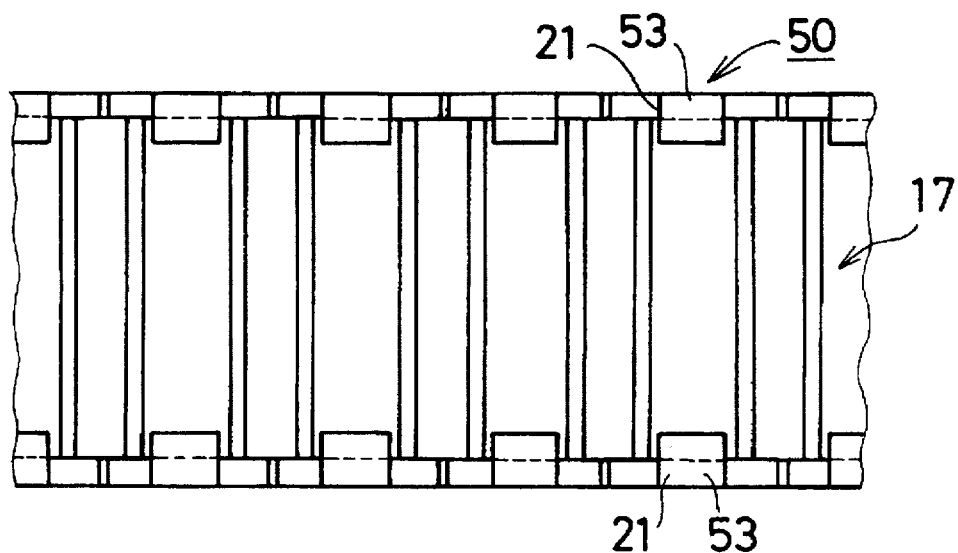
FIG. 10 is a plan view of the flexible drive member shown in FIG. 9.
Figure 11:
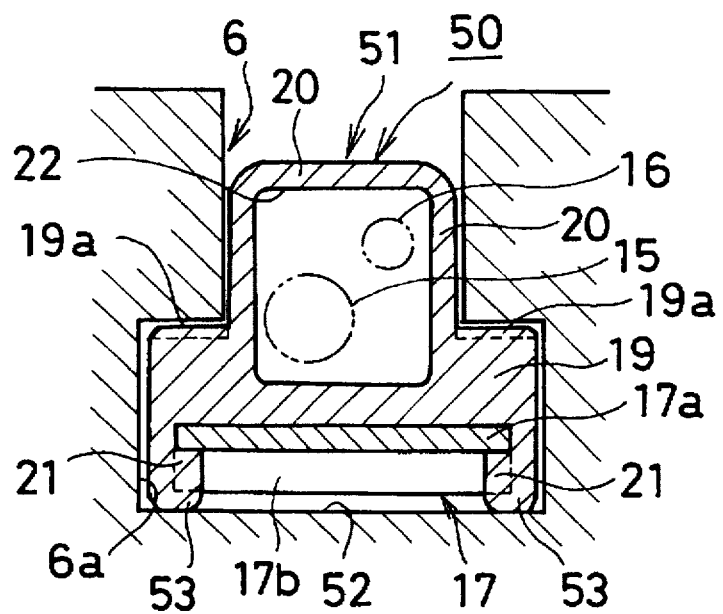
FIG. 11 is a cross-sectional view along a line XI—XI in FIG. 9.

Referring to FIGS. 9, 10 and 11, a flexible drive member according to a second embodiment of the present invention is described.

The flexible drive member 50 of the second embodiment differs only slightly from the flexible drive member 2 of the first embodiment, and, therefore, only the differences are described. Different from the ridge member 18 of the first embodiment, a ridge member 51 of the second embodiment includes protrusions 53 having a generally semi-circular cross-section which are additionally formed on the hook-shaped engaging portions 21. The tips of the protrusions 53 extend slightly beyond the tip of the teeth 17b of the toothed belt 17. The remainder of the flexible drive member 50 is the same as the member 2 of the first embodiment, and, therefore, the same reference numerals as used for the first embodiment are used and no further description is made.

The flexible drive member 50, too, is useable in an apparatus for moving a fluid-operated device, such as the clamping device 1. The use of the flexible drive member 50 is described with reference to FIG. 6. The tips of the protrusions 53 contact the inner surface of the T-shaped groove 31 in the drive unit base 25 in the area 151, but the teeth 17b do not. Thus, the tips of the teeth 17b of the toothed belt 17 are prevented from being abraded.

When the clamping device moving apparatus is used for a clamping device adapted to clam a lower die to a bolster of a press, the T-shaped groove 6 will open upward, as shown in FIG. 11. Accordingly, when the flexible drive member 50 is in the T-shaped groove, the protrusions 53 will contact a groove surface 52 of the T-shaped groove 6 and, therefore, the tips of the teeth 17b are prevented from being abraded.

Modified versions of the flexible drive member according to the first and second embodiments of the invention are described with reference to FIGS. 12, 13, 14, 15, and 16. The same reference numerals as used to describe the first and second embodiments are used for the same or similar components and no further description is given. Furthermore, although not shown, the manner in which end surfaces of ridge members 63, 73, 83, 93, 93a of the respective embodiments abut against adjacent ones is the same as described with respect to the first embodiment.

Figure 12:
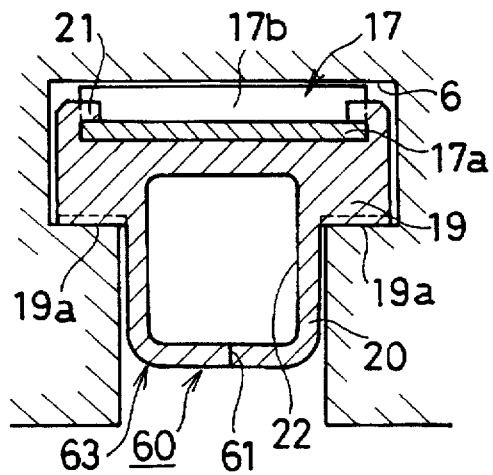
FIGS. 12, 13, 14, 15, and 16 are transverse cross-sectional views of various modifications of the flexible drive member according to the present invention.

A flexible drive member 60 shown in FIG. 12 differs from the member 2 of the first embodiment in that a slit 61 is formed in a part of the wall defining the hole 22 of the ridge member 63. By pressing the wall portion having the slit 61 inward, the hole 22 is opened and the hydraulic hose 15 and the signal cable 17 can be easily placed in the hole 22. Because of the elasticity of the material, the wall portion returns to the original state to thereby hold the hose 15 and the cable 16 in the hole 22. The thickness of the wall defining the hole 22 can be determined depending on the elasticity of the material used, to thereby provide appropriate elastic deformation.

Figure 13:
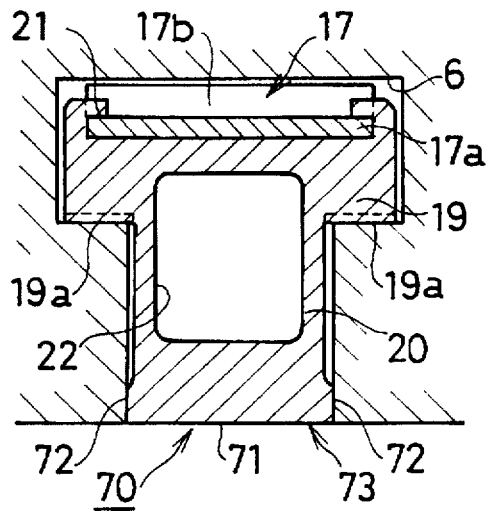

A flexible drive member 70 shown in FIG. 13 differs from the member 2 of the first embodiment only in that a smaller width portion 20 of a ridge member 73 is elongated in the direction of the opening of the T-shaped groove 6 or 31 to thereby close the opening with a surface 71 in flush with the plane in which the opening lies. The width of the smaller width portion 20 between the side surfaces 72 is determined such that the side surfaces 72 can contact with the inner surface of the T-shaped groove 6 or 31 and are still slidable in the groove. This arrangement prevents scraps and debris from entering into the T-shaped groove 6 or 31 which would interfere with the operation of the flexible drive member 70. The flexible drive member 70 may be more frequently used with a T-shaped groove opening upward, it is preferable to add protrusions like the protrusions 53 shown in FIGS. 9–11.

Figure 14:
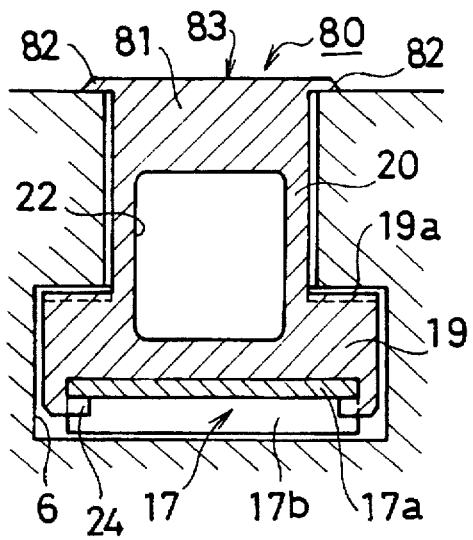

A flexible drive member 80 shown in FIG. 14 differs from the flexible drive member 2 in that a smaller width portion 20 of a ridge member 83 extends further and has an expanded portion 81 outside the T-shaped groove 6. The expanded portion 81 includes engagements 82 which engage with the edges of the opening of the T-shaped groove 6. The flexible drive member 80 is used with the upward opening T-shaped groove 6 or 31, with the engagements 82 supported by the edges of the T-shaped grooves. Because the T-shaped groove is closed with the expanded portion 81, no debris enters into the groove 6 or 31 so that the movement of the flexible drive member 80 is not interfered.

Figure 15:
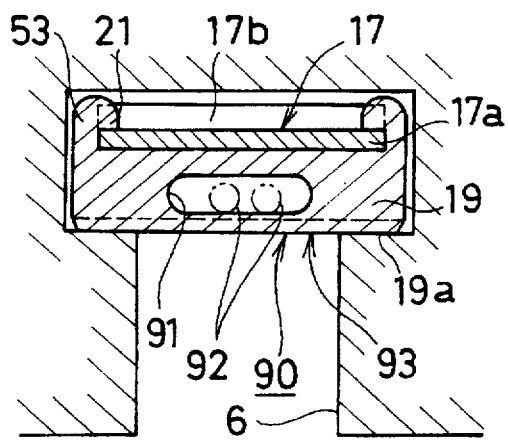
Figure 16:
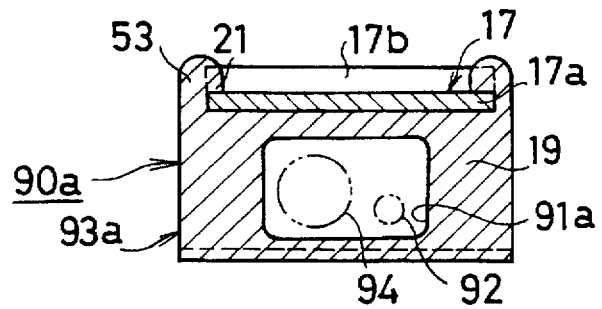

A flexible drive member 90 shown in FIG. 15 has no smaller width portion in a ridge member 93. The member 90 is generally rectangular in its cross-section. When the flexible drive member 93 is guided in the T-shaped groove 6 or 31, only a larger width portion 19 is guided with the opposite sides of the portion 19 guided. The dimensions of a longitudinal hole 91 are limited by the size of the flexible drive member 90, and, in FIG. 15, wires 92 are placed in the holes 91. If a thicker ridge member 93a as shown in FIG. 16 can be used, a larger hole 91a may be formed so that a hydraulic hose 94 and a wire 92 can be placed in it.

In all of the flexible drive members shown in FIGS. 12 through 16, the ridge members are attached to the toothed belt 17 by means of the hook-shaped engaging portions 21 in such a manner that the surfaces of the ridge members adjacent in the longitudinal direction of the belt 17 contact with each other. The respective ridge members have holes 22 therein. Thus, the flexible drive members can transmit pulling and pushing forces to the clamping device 1, and, at the same time, they can hold one or more of an elongated hose and wires or cable.

Figure 17:
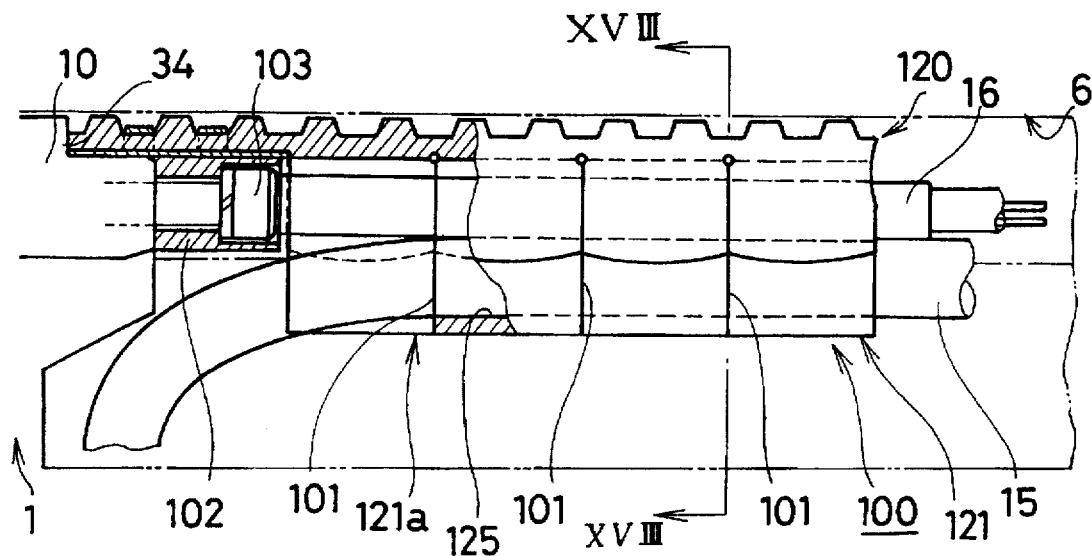
FIG. 17 is a front, partly cross-sectional view of the clamping device end of the die clamping device moving apparatus utilizing a flexible drive member according to another embodiment of the present invention.
Figure 18:
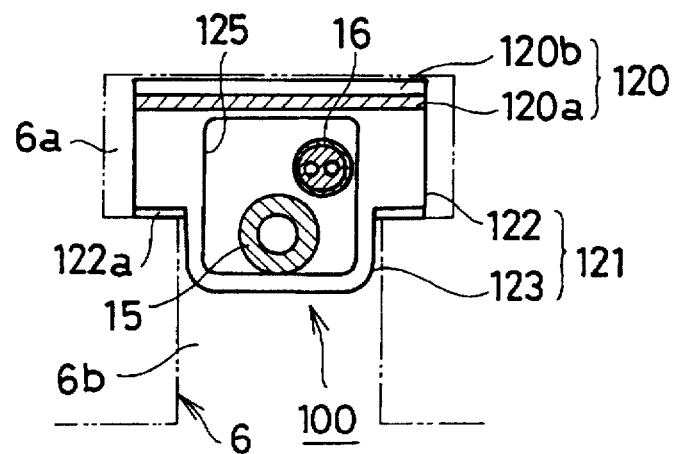
FIG. 18 is a cross-sectional view along a line XVIII—XVIII in FIG. 17.

A flexible drive member according to another embodiment of the present invention is now described with reference to FIGS. 17, 18 and 19. The same reference numerals as used in the description of the afore-described embodiments denote the same or similar components.

In the illustrated example, the flexible drive member 100 of this embodiment is used in an apparatus for moving a hydraulic clamping device. The apparatus includes a drive unit 110 for pushing and pulling a hydraulic clamping device 1 between its clamping and standby positions by means of the flexible drive member 100. The clamping device 1 is used to clamp an upper die of a press to a slide 4. The apparatus is secured to the slide 4 of the press.

The clamping device 1 has substantially the same structure as described with reference to FIG. 6, which is hydraulically operated and is movable along a T-shaped groove 6 formed in th slide 4. A hydraulic hose 15 and a signal cable 16 are coupled to the clamping device 1.

The flexible drive member 100 comprises a toothed belt section 120 and ridge members 121 which are fabricated integral with each other, as shown in an enlarged view showing the distal end of the flexible drive member 100. The member 100 is dimensioned such that it can pass through the T-shaped groove 6 in a somewhat loose fashion. The flexible drive member 100 has a T-shaped cross-section substantially conforming with the cross-section of the T-shaped groove 6, as shown in FIG. 18.

The toothed belt section 120 is substantially equivalent to a commercially available toothed belt and includes a belt body 120a having a width more or less smaller than the width of a wider portion 6a of the T-shaped groove 6. The belt section 120 further includes a succession of teeth 120b formed on one surface of the belt body 120a. Each of the teeth 120b extends across the entire width of the belt body 120a.

The ridge members 121 are formed on the opposite side of the belt body 120a, one for two pitches of the teeth 120b. FIGS. 17 and 18 show one of the ridge members 121. The ridge member 121 includes a larger width portion 122 extending from the belt body 120a, a smaller width portion 123 extending from the larger width portion 122, and a hole 125 extending through the ridge member 121 in the direction of the length of the belt section 120.

The larger width portion 122 has the same width as the toothed belt section 120, and the smaller width portion 123 centrally located on the portion 122. The bottom surfaces 122a of the side portions of the larger width portion 122 are downward convex as shown in FIG. 17.

The smaller width portion 123 has such a width as to be capable of moving in a narrower portion 6b of the T-shaped groove 6, and extends to such an extent that it does not protrude beyond the edges of the opening of the T-shaped groove 6.

The longitudinally extending hole 125 is formed through both of the larger and smaller width portions 122 and 123 of the ridge member 121. The shape of the hole 125 is not limited to the illustrated one but must have dimensions to allow the hose 15 and the cable 16 to be freely extend therethrough.

When the flexible drive member 100 is straight, end surfaces 101 of adjacent ridge members 121 contact with each other. The respective end surfaces 101 are located at a mid point between adjacent teeth 120b of the toothed belt section 120.

The toothed belt section 120 and the ridge members 121 are formed of, for example, urethane, and, although not shown, metallic wires for preventing excessive elongation of the flexible drive member 100 are embedded in the belt body 120a.

Figure 19:
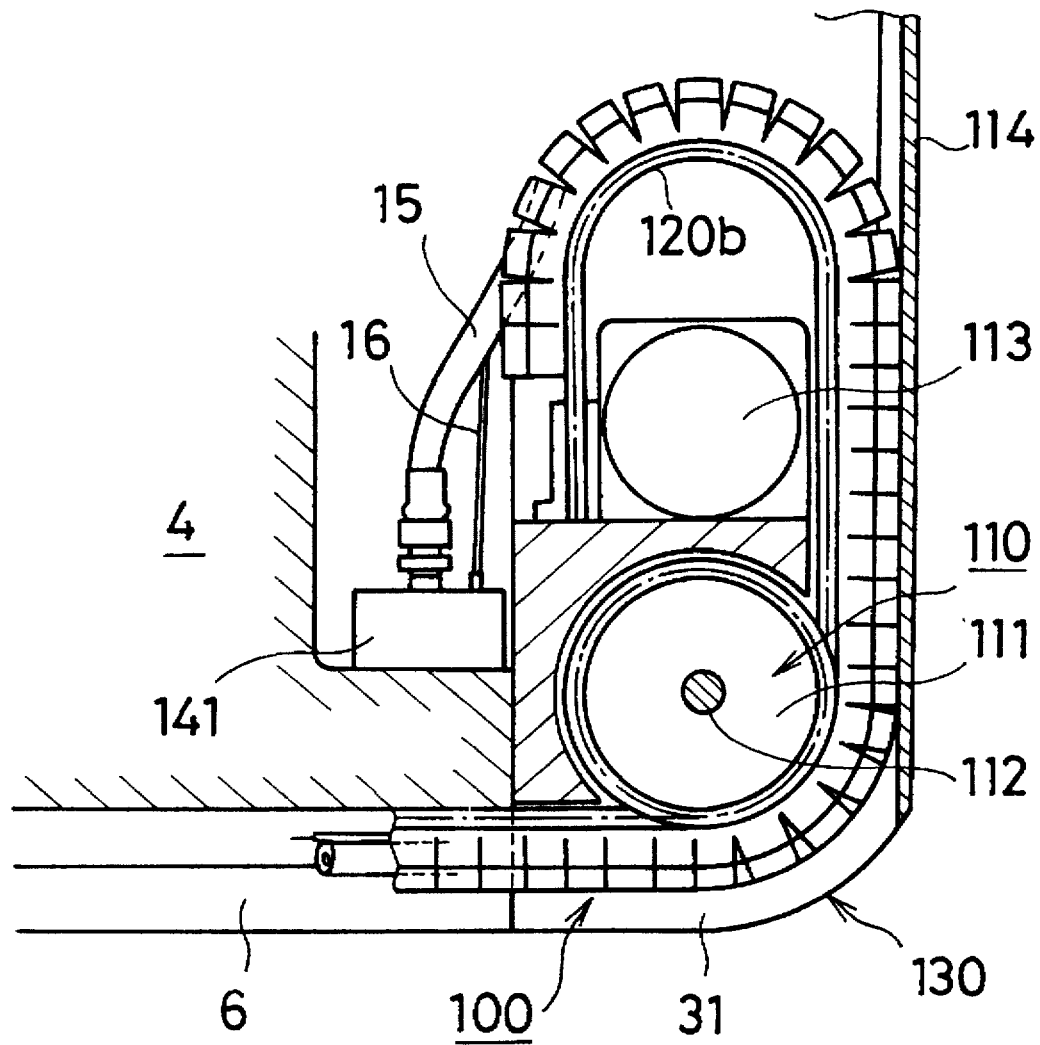
FIG. 19 is a longitudinal cross-sectional view showing a general structure of a drive unit which is located rightward of the portion shown in FIG. 17.

The drive unit 110 is shown in FIG. 19. The drive unit 110 includes a base 130. A toothed pulley 111, a shaft 112 for the pulley 111, a motor 113, and a guide 114 are mounted on the base 130.

The base 130 is fixed to an appropriate location in the lower portion of the slide 4 of the press, and includes a T-shaped groove 31 which continues the T-shaped groove 6 formed in the lower surface of the slide 4. The T-shaped groove 31 curves from a horizontal section continuing the T-shaped groove 6 upward and is open at the upper end of the base 130.

The toothed pulley 111 is rotatably supported on the shaft 112 and is driven to rotated selectively in forward and reverse directions by the motor 113. A portion of the toothed periphery of the pulley 111 extends into the T-shaped groove 31 at its curving area. In this area, the teeth of the pulley 111 engage with the teeth 120b of the flexible drive member 110.

The guide 114 is similar to the guide 33 shown in FIG. 6. It guides up the flexible drive member 100 when it goes out of the T-shaped groove 31. The guide 114 is formed on the inner surface of a cover which is secured to the base 130, and has guide surfaces which contact with the convex surfaces 122a of the larger width portions 122 and the side surfaces of the smaller width portions 123 of the flexible drive member 100. The length of the guide 114 is determined, depending on the length of the portion of the the flexible drive member 110 which are pulled up.

The proximal end of the flexible drive member 100 is coupled to the drive unit 110 with its distal end coupled to the clamping device 1. The coupling between the flexible drive member 100 with the clamping device 1 is shown in FIG. 17. A portion of an engagement section 10 of the clamping device 1 which engages with the T-shaped groove 6 or 31 is removed to form a recess 34. The distal end portion of the toothed belt section 120 is placed on the recess 34, and is secured to the engagement section 10 by means of a connecting member and a bolt 103. Ridge members 121 in this portion are removed from the flexible drive member 100. The ridge member 121a closest to the engagement section 10 has a part of the hole defining wall removed so that the hose 15, which is coupled to the clamping device 1, can extend away from the toothed belt section 120. However, the ridge member 121a is necessary to secure the transmission of the pushing force to the coupling portion between the flexible drive member 100 with the engagement section 10.

As shown in FIG. 19, the other end portion of the flexible drive member 100 goes out of the T-shaped groove 31, is guided by the guide 114 upward, is bent with the teeth 120b facing inward, and extends downward to a surface of the base 130 where the motor 113 is installed. The proximal end of the flexible drive member 100 is secured to the base 130 by suitable securing means. The proximal ends of the hose 15 and the signal cable 16 held by the flexible drive member 100 extend to a piping block 141 and to a terminal box (not shown), respectively, and are secured.

With the compressed oil removed from the clamping device 1, when the motor 113 of drive unit 110 is driven to rotate in one or the other directions, the clamping device 1 coupled to the distal end of the flexible drive member 1 moves one or the other direction along the T-shaped grooves 6 and 31 shown in FIG. 19. In the state shown in FIG. 19, the bent portion of the flexible drive member 100 is nearly in its lower limit position with the distal end (not shown in FIG. 19) of the flexible drive member 100 extending into the groove 6 and with the clamping device 1 clamping an upper die of a press. When the compressed oil is removed from the clamping device 1 in the state shown in FIG. 19, the clamping device 1 unclamps the upper die. Then, the motor 113 is driven to rotate in a predetermined direction (counterclockwise in the illustrated example), the toothed pulley 111 drives the flexible drive member 100 engaging therewith to be retracted toward the base 130. Because the flexible drive member 100 is guided by the guide 114, the bent portion rises. When the clamping device 1 is retracted to its standby position, and retained there. The control for stopping the apparatus may be done in the same manner as described with reference to FIGS. 1 through 8.

The clamping device 1 can be moved from its standby position to the clamping position by rotating the motor 113 in the opposite direction so that the pulley 111 drives the flexible drive member 100 in the opposite direction. After the clamping device 1 arrives at the clamping position, compressed oil is supplied to the clamping device 1 to clamp an upper die of the press.

When the toothed pulley 111 drives the flexible drive member 100, the flexible drive member 100 is supported on the shoulder between the larger and smaller width portions of the T-shaped groove 31 in the area where the flexible drive member 100 goes around the pulley 111, and, therefore, the flexible drive member 100 is not disengaged from the toothed pulley 111. Although the ridge members 121 of the flexible drive member 100 are provided one for two pitches of the teeth 120b, the flexible drive member 100 is flexible enough unless it is used with a toothed pulley having an extremely small diameter.

The ridge members 121 of the flexible drive member 100 may have a structure like any one of the structures shown in FIGS. 12, 13, 14, 15, and 16.

Further, the toothed belt section 120 and the ridge members 121 may be formed integral in the same manufacturing steps, but they may be made separately and joined together by fusion or by a bonding agent.

In the description, a hydraulically operated clamping device only is described, but, needless to say, a pneumatic clamping device can be used as well.

What is claimed is:

1. A flexible drive member comprising:

a toothed belt section including teeth formed on one surface thereof, said teeth being adapted to engage with toothed belt driving means; and ridge members arranged along the length of said toothed belt section on a rear surface of said belt section opposite to the surface on which said teeth are disposed, said ridge members abutting against adjacent ones of said ridge members when said toothed belt section extends straight, and including holding means for holding an elongated, flexible member along said rear surface of said toothed belt section.

2. The flexible drive member according to claim 1 wherein each of said ridge members includes a portion to be guided when said flexible drive member is moved along the length thereof.

3. The flexible drive member according to claim 1 wherein said flexible drive member has a generally T-shaped transverse cross-section.

4. The flexible drive member according to claim 1 wherein said holding means comprises a longitudinal hole extending through a respective one of said ridge members along the length direction of said toothed belt section.

5. The flexible drive member according to claim 1 wherein said ridge members are formed of elastic material, and said holding means comprises a longitudinal hole extending through a respective one of said ridge members along the length direction of said toothed belt section, a portion of the wall of said ridge member defining said hole facing away from said toothed belt section includes a slit therein so as that said hole can be elastically opened and closed.

6. The flexible drive member according to claim 1 wherein said toothed belt section is a toothed belt, and said ridge members are fabricated separate from said toothed belt and attached to said toothed belt.

7. The flexible drive member according to claim 6 wherein each of said ridge members includes engaging portions on opposite sides thereof across the width of said ridge member, said engaging portions clipping the side edges of said toothed belt in the bottom of a toothed space.

8. The flexible drive member according to claim 6 wherein each of said ridge members has portions to be guided which protrude beyond the tips of the teeth of said toothed belt, said portions to be guided being located at points on the opposite side edges of said toothed belt in a toothed space.

9. The flexible drive member according to claim 1 wherein said ridge members are fabricated integral with said toothed belt section.

10. The flexible drive member according to claim 9 wherein the abutting surfaces of said ridge members are located in tooth spaces of said toothed belt.

11. A fluid-operated device moving apparatus comprising:

a flexible drive member including a toothed belt section including teeth formed on one surface thereof, and ridge members arranged along the length of said toothed belt section on a rear surface of said belt section opposite to the surface on which said teeth are disposed, said ridge members abutting against adjacent ones of said ridge members when said toothed belt section extends straight, and including holding means for holding an at least a fluid hose along said rear surface of said toothed belt section, said flexible drive member having a T-shaped transverse cross-section corresponding to a predetermined T-shaped groove for being guided in said T-shaped groove;

a fluid-operated device having an engagement section engaging with said T-shaped groove, one end of said flexible drive member being coupled to said fluid operated device for moving said fluid-operated device along said T-shaped groove; and a drive unit having a toothed pulley having teeth engaging with the teeth of said toothed belt of said flexible drive member for selectively pushing and pulling said flexible drive member along the length direction thereof to thereby selectively push and pull said fluid-operated device along said T-shaped groove.

12. The fluid-operated device moving apparatus according to claim 11 wherein said drive unit includes a rotary drive device for driving said toothed pulley to rotate.

13. The fluid-operated device moving apparatus according to claim 11 wherein said drive unit includes a cylinder device which operates to give linear shift of the position of said toothed pulley.

14. A fluid-operated device moving apparatus comprising:

a flexible drive member including a toothed belt section including teeth formed on one surface thereof, and ridge members arranged along the length of said toothed belt section on a rear surface of said belt section opposite to the surface on which said teeth are disposed, said ridge members abutting against adjacent ones of said ridge members when said toothed belt section extends straight, and including holding means for holding an at least a fluid hose along said rear surface of said toothed belt section, said flexible drive member having a T-shaped transverse cross-section corresponding to a predetermined T-shaped groove for being guided in said T-shaped groove;

a die clamping device having an engagement section engaging with said T-shaped groove, one end of said flexible drive member being coupled to said die clamping device for moving said die clamping device along said T-shaped groove between a die clamping position and a standby position; and a drive unit having a toothed pulley having teeth engaging with the teeth of said toothed belt of said flexible drive member for selectively pushing and pulling said flexible drive member along the length direction thereof to thereby selectively push and pull said die clamping device along said T-shaped groove.

15. The fluid-operated device moving apparatus according to claim 14, further comprising fixing means for releasably fixing said clamping device at said standby position.

16. The fluid-operated device moving apparatus according to claim 15 wherein said fixing means comprises a fluid-operated cylinder which urges said engagement section of said clamping device in said standby position in the direction away from the bottom of said T-shaped groove.

17. The fluid-operated device moving apparatus according to claim 16 wherein said fixing means comprises a fluid-operated cylinder disposed in the bottom of said T-shaped groove at a location corresponding to said standby position, said fluid-operated cylinder pressing against said engagement section of said clamping device.

18. The fluid-operated device moving apparatus according to claim 16 wherein said fixing means comprises a fluid-operated cylinder disposed in said engagement section of said clamping device, said fluid-operated cylinder pressing against the bottom of said T-shaped groove.

* * * * *